United States Patent [19]

Richardson et al.

[11] Patent Number: 5,186,081
[45] Date of Patent: Feb. 16, 1993

[54] METHOD OF REGULATING SUPERCHARGER BOOST PRESSURE

[75] Inventors: Daniel J. Richardson, Grand Blanc; Michael D. Parr, Highland, both of Mich.

[73] Assignee: General Motors Corporation, Detroit, Mich.

[21] Appl. No.: 712,121

[22] Filed: Jun. 7, 1991

[51] Int. Cl.⁵ .............................. F02B 37/12
[52] U.S. Cl. .................... 74/859; 123/383; 123/559.1; 123/564; 60/597; 60/600; 364/431.01
[58] Field of Search .......... 60/597, 598, 600, 602; 123/383, 559.1, 564; 74/859, 860; 364/431.01, 431.03, 431.04, 431.05, 431.07

[56] References Cited

U.S. PATENT DOCUMENTS

| | | | |
|---|---|---|---|
| 4,556,038 | 12/1985 | Okamoto et al. | 60/602 X |
| 4,620,420 | 11/1986 | Gloss et al. | 60/602 |
| 4,697,421 | 10/1987 | Otobe et al. | 60/602 |
| 4,741,163 | 5/1988 | Hidaka et al. | 60/602 |
| 4,802,456 | 2/1989 | Okane et al. | 123/564 |
| 4,809,660 | 3/1989 | Marsh et al. | 123/417 |
| 4,848,086 | 7/1989 | Inoue et al. | 60/602 |
| 4,858,496 | 8/1989 | Iwatsuki et al. | 74/863 |
| 4,926,640 | 5/1990 | Kazuo et al. | 60/602 |
| 5,050,452 | 9/1991 | Morioka | 74/860 X |
| 5,065,319 | 11/1991 | Iwatsuki et al. | 364/431.03 X |

FOREIGN PATENT DOCUMENTS

| | | | |
|---|---|---|---|
| 62-41926 | 2/1987 | Japan | 123/564 |
| 63-29313 | 10/1988 | Japan | 123/564 |

Primary Examiner—Leslie A. Braun
Assistant Examiner—William O. Trousdell
Attorney, Agent, or Firm—Howard N. Conkey

[57] ABSTRACT

The torque output of a fluidic torque converter that is driven by a supercharged engine and whose output is coupled to the input of a hydraulic automatic transmission is determined and compared with a transmission input torque limit which is a function of the transmission gear. The boost pressure output of the engine supercharger is limited based on this comparison to closed loop limit the torque output of the torque converter at the transmission input torque limit.

7 Claims, 4 Drawing Sheets

METHOD OF REGULATING SUPERCHARGER BOOST PRESSURE

BACKGROUND OF THE INVENTION

This invention relates to a method of controlling the boost pressure of a supercharger of an internal combustion engine.

It is common to use superchargers for internal combustion engines to increase the power output of the engine by boosting the pressure in the engine intake manifold and thereby increase the engine air throughput. When employing a supercharger on an engine, caution must be taken to avoid operating conditions in which torque limitations in the vehicle drivetrain may be exceeded or in which the durability of the engine is reduced.

While various controllers have been proposed to regulate supercharger boost pressure, these controls do not automatically compensate for all barometric conditions affecting the engine output torque and generally lack precision in maximizing the engine power output while preventing supercharger operation resulting in torque limitations in the vehicle drivetrain being exceeded or deterioration in the engine durability.

SUMMARY OF THE INVENTION

The present invention is directed to an improved method of regulating the boost pressure output of an engine supercharger in which the boost pressure is limited so that drivetrain torque values are precisely limited at a predetermined drivetrain torque limit values. This enables engine output to be maximized while at the same time preventing operation in regions where drivetrain torque limitation are exceeded or in which the durability of the engine is reduced.

In accord with a principle feature of this invention, the output torque at a predetermined point in the drivetrain is determined and compared with a predetermined limit torque value. Based on this comparison, the supercharger boost pressure is limited at a value at which the determined output torque is limited at the predetermined limit value. This closed loop regulation of the output torque via boost control provided for precise control of torque to assure that the torque limitations are not exceeded while otherwise allowing the maximum engine power to be utilized.

According to one feature of the invention, the predetermined limit torque is reduced when a hot engine condition exists to avoid a condition giving rise to deterioration in engine durability.

According to yet another feature of the invention, the predetermined limit torque is reduced after the engine has operated in a power enrichment mode for a predetermined time period to avoid excessive thermal loading on the engine.

According to another principle feature of this invention, the torque output of a fluidic torque converter driven by the engine and whose output is coupled to the input of a hydraulic automatic transmission is determined and compared with a transmission input torque limit. The supercharger boost pressure is limited based on this comparison to closed loop limit the torque output of the torque converter at the transmission input torque limit. Since the transmission input torque limit varies depending upon the selected transmission gear, a separate transmission input torque limit is predetermined for each transmission gear and stored in memory. The supercharger boost pressure is then limited based on a comparison of the determined torque output of the torque converter with the stored torque limit according to the selected transmission gear.

In accord with another feature of the invention, the torque limit based on the transmission input torque limit is reduced by predetermined amounts based on sensed hot operating condition of the engine and/or operation of the engine in a power enrichment mode for a predetermined period.

With the control method of this invention, the torque output of a selected point in the drivetrain is closed loop limited to provide precise control of the limited torque that is not affected by barometric condition to prevent excessive torque conditions while not unnecessarily limiting torque output.

DESCRIPTION OF THE DRAWINGS

Figure 1:
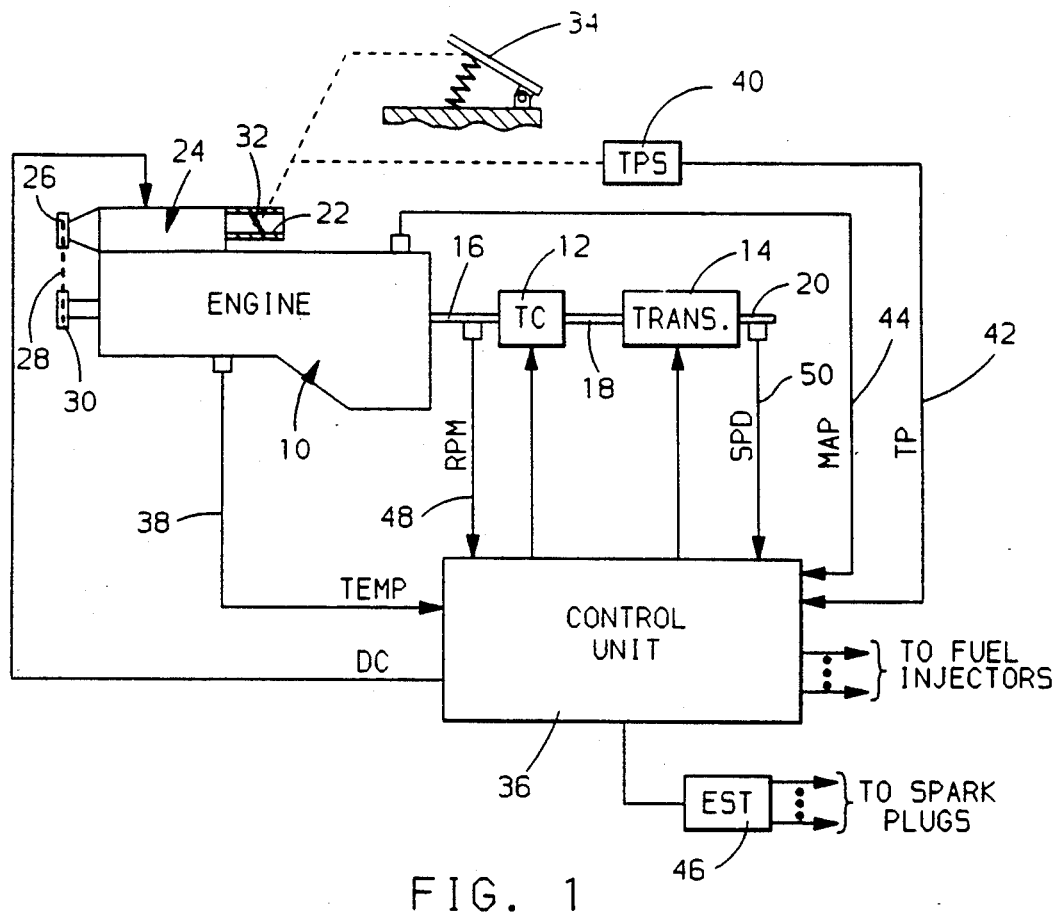
FIG. 1 is a schematic diagram depicting a motor vehicle drivetrain including a supercharged internal combustion engine and a computer-based engine control unit.

Referring to FIG. 1, there is illustrated a vehicle drivetrain comprising an internal combustion engine 10, a conventional fluidic torque converter 12 and a conventional hydraulic automatic transmission 14. The engine output shaft 16 drives the input member (impeller) of the torque converter 12, the output member (turbine) of the torque converter 12 drives the transmission input shaft 18, and the transmission output shaft 20 drives the vehicle wheels for propelling the vehicle.

Air flow into the engine intake manifold is through an intake throttle bore 22 and a supercharger assembly 24 having an input pulley 26 driven via a belt 28 by an engine crankshaft driven pulley 30. A throttle 32 provides for operator control of the ingestion of air and in this respect is controlled in a conventional manner by an operator manipulated accelerator pedal 34. The supercharger 24 functions to boost the pressure in the intake manifold of the engine 10 and therefore its air throughput so as to increase the engine 10 torque output.

A microcomputer based control unit 36 is provided for controlling various drivetrain functions. These functions include fuel metering, spark ignition, torque converter lockup clutch control and transmission gear ratio control. In this respect, fuel injectors are provided with timed injection pulses in response to measured engine operating parameters that typically include engine coolant temperature TEMP provided by a conventional temperature on input line 38, throttle position TP provided by a conventional throttle position sensor 40 on input line 42, and manifold absolute pressure MAP provided by a conventional pressure sensor on input line 44. Other parameters may also be used as desired. The fuel control function is conventional. Typically, the injectors are controlled to establish a desired air/fuel ratio and which may typically establish a rich mixture during engine warm-up and for power enrichment and provide for a mixture having a stoichiometric ratio otherwise.

The control of the spark timing is also conventional. In general, the control unit 36 provides a commanded spark timing value to a conventional spark timing unit 46 which initiates combustion in the various engine cylinders in accordance with the commanded valued. Parameters typically used to establish the desired timing value include MAP and engine speed RPM provided by a conventional speed sensor on input line 48 generally in the form of pulses at predetermined crankshaft positions so as to have a frequency proportional to engine speed.

Additionally, the control unit 36 controls the gear ratio of the transmission 14 as well as the state of a lock-up clutch in the torque converter 12 in response to parameters that typically include vehicle speed SPD provided by a conventional sensor on input line 50 and engine load such as represented by the throttle position signal TP. These control functions are also standard in form and are not described in further detail.

In accord with the principles of this invention, the control unit 36 further provides a duty cycle modulated boost control signal having a duty cycle DC to a solenoid valve in the supercharger assembly 24 for closed loop limiting drivetrain torque in accord with predetermined values. In this embodiment, the boost control signal is in the form of a constant frequency variable pulse width signal wherein the width is varied from zero (0% DC) to the full period (100% DC) for establishing boost control.

The microcomputer contained within the electronic controller 36 has stored therein the instructions necessary to implement the algorithms for controlling the various functions set forth above. When power is first applied to this system from a vehicle battery (not illustrated) the computer program is initiated. The program may first provide for initialization of various random access memory variables to calibrated values and other functions. When this initialization routine is completed, a background loop may be executed that contains various system maintenance and diagnostic routines. This loop may be interrupted by one of several possible system interrupts whereby control will be shifted to the appropriate interrupt service routine. The fuel and spark ignition routines are typically executed in response to a high frequency interrupt provided at, for example 3.125 millisecond intervals, while the transmission control routine and the supercharger boost control algorithm of this invention are executed in response to a lower frequency interrupt provided a, for example, 100 millisecond intervals.

Figure 2:
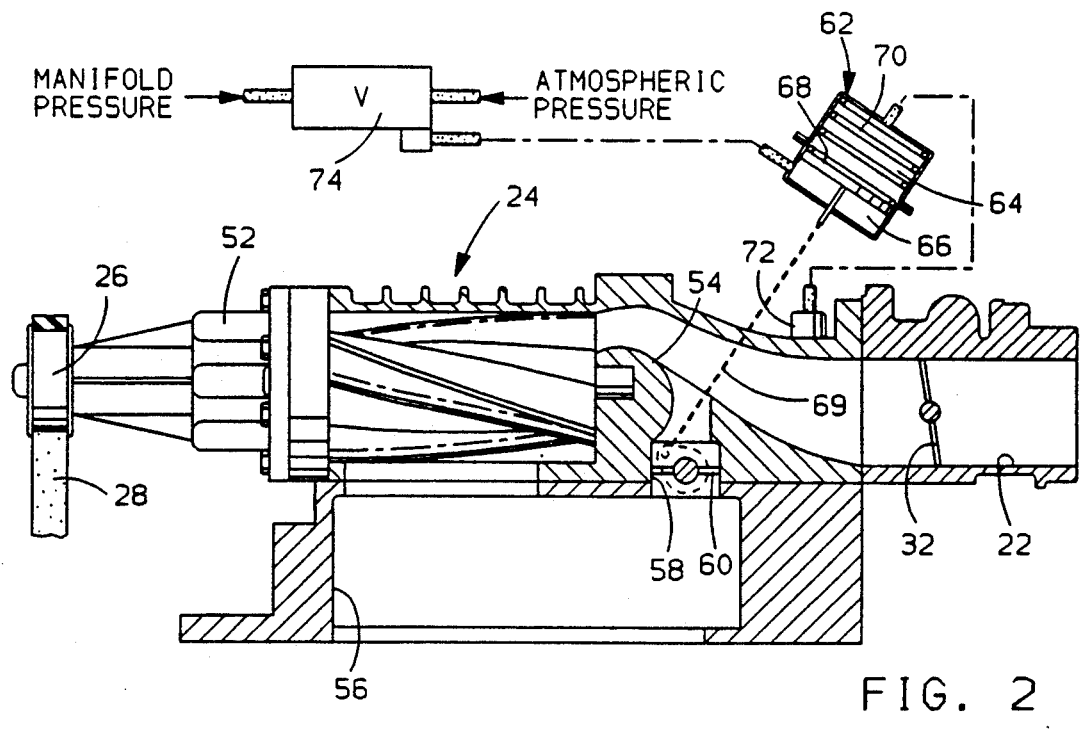
FIG. 2 is a diagram of the air intake system of the engine of FIG. 1 including an engine driven supercharger.

Referring to FIG. 2, the supercharger assembly 24 of FIG. 1 is illustrated. This assembly is located in the air intake passage of the engine 10 between the throttle 32 and the intake manifold of the engine. In this embodiment, the assembly includes a supercharger 52 in the form of a Roots type blower that is driven via the input pulley 26 from the crankshaft of the engine 10. An airflow input passage 54 to the supercharger 52 communicates with the air flow passage in the intake throttle bore 22 downstream of the throttle 32. An output passage 56 from the turbocharger 52 directly communicates with the intake manifold of the engine 10.

A passage 58 is provided that bypasses the supercharger 52. Positioned within the bypass passage 58 is a rotatable throttle plate 60 that is rotatable between a fully closed position to inhibit air flow through the bypass passage 58 and a fully open position providing minimum restriction to air flow through the bypass passage 58. When the throttle plate 60 is in the fully open position the pressures in, the input and output passages 54 and 56 of the supercharger 52 are equal which has the effect of unloading the supercharger 52 so that no boost is provided and the parasitic losses of the supercharger 52 are minimized. When the throttle valve 60 is in its fully closed position, maximum boost pressure in the engine intake manifold is provided. By regulating the rotational position of the throttle plate 60 between it's fully open and closed positions, the boost provided by the turbocharger 52 may be regulated. As will be later described, the throttle plate 60 is controlled to regulate boost pressure so as to closed loop limit driveline torque at predetermined values.

A valve actuator 62 is provided for controlling the position of the throttle blade 60. The valve actuator 62 is divided into a first and second pressure chambers 64 and 66 by a diaphragm 68. A connecting arm 69 couples the diaphragm with the throttle blade 60 such that as the diaphragm 68 is moved in direction decreasing the volume of the chamber 66, the throttle blade 60 is moved in a direction closing the bypass passage 58 and conversely, as the diaphragm 68 is moved in direction increasing the volume of the chamber 68, the throttle blade 60 is moved in a direction opening the bypass passage 58. A pre-load spring 70 is positioned in the chamber and biases the diaphragm 68 in direction to close the bypass passage 58.

The pressure chamber 64 is pneumatically coupled to the intake passage between the throttle 32 and the supercharger 52 via a pressure distributor 72 so that the pressure in the pressure chamber is at the input pressure of the supercharger 52 downstream of the throttle 32. The pressure chamber 66 is coupled to the output of an electromagnetic solenoid valve 74 which directs pressure from an engine manifold pressure inlet to the chamber 66 when de-energized and directs pressure from the atmosphere to the chamber 66 when energized. The solenoid valve is controlled by the duty cycle modulated signal output of the control unit 36. By modulating the duty cycle of the signal controlling the solenoid valve 74, the pressure in the chamber 66 may be controlled at any pressure between manifold pressure (0% duty cycle) to atmospheric pressure (100% duty cycle).

Maximum boost pressure based on engine load is enabled when a 100% duty cycle signal (full on) is applied to the solenoid valve 74. This results in full atmospheric pressure being applied to the pressure chamber 66. With this condition, at low load, light acceleration conditions where the vacuum downstream of the throttle 32 is greater than a reference pressure represented by the preload of the spring 70, the diaphragm 68 is moved by atmospheric pressure to open the valve 60 which equalizes the supercharger 52 inlet and outlet pressures. This condition results in no boost in the engine manifold pressure by the supercharger 52. Whenever the engine load is increased by operation of the throttle 32 to a level at which the vacuum in the engine intake below the throttle 32 becomes less that the preload reference pressure established by the spring 70, diaphragm 68 is moved to close the bypass valve 60 so that full boost is provided by the supercharger 52. In one embodiment, the spring represents a reference pressure of 3 in Hg so that the bypass valve is closed to provide full boost when the engine load is such that the pressure at the inlet of the supercharger 52 downstream of the throttle 32 is within 3 in Hg of atmospheric pressure.

As will be described in reference to FIGS. 3a and 3b, in accord with this invention, when a determined drivetrain torque exceeds a predetermined limit resulting from the boost pressure provided by the supercharger 52, the duty cycle value of the signal controlling the solenoid valve 74 is decreased from 100% to apply boost pressure to the pressure chamber 66 in varying degrees to increase the pressure in the pressure chamber 66 from atmospheric pressure toward the boost pressure in the intake manifold. By adjusting the duty cycle value of the solenoid valve 74 control signal based on the error between the determined drivetrain torque value and the limit torque value, the bypass valve 60 is positioned to an intermediate position establishing a boost pressure less than maximum at which the drivetrain torque is equal to the limit value.

Figure 3A:
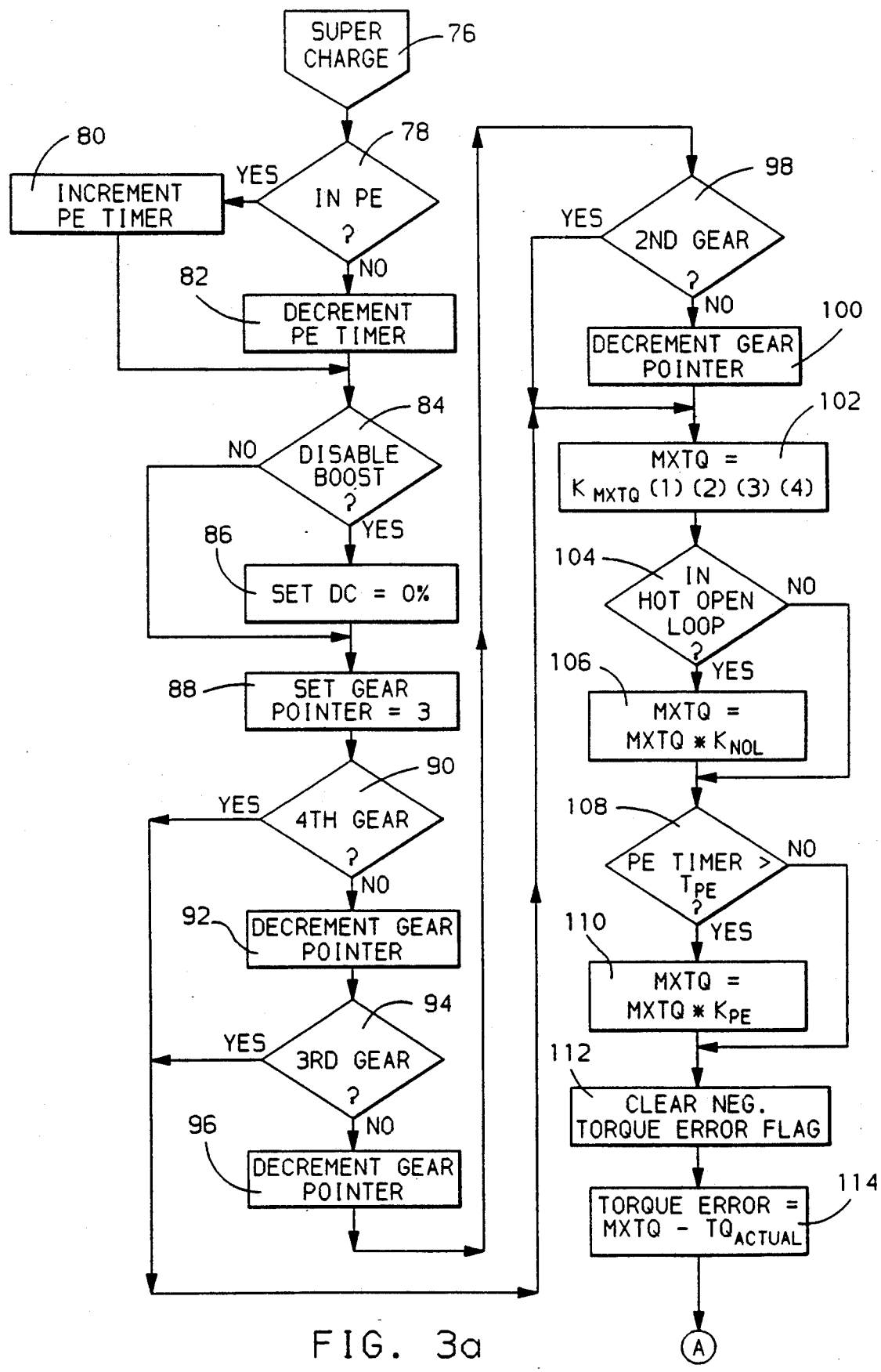
FIGS. 3a, 3b, and 4 are flow diagrams illustrating the operation of the control unit of FIG. 1 in carrying out the principles of this invention.
Figure 3B:
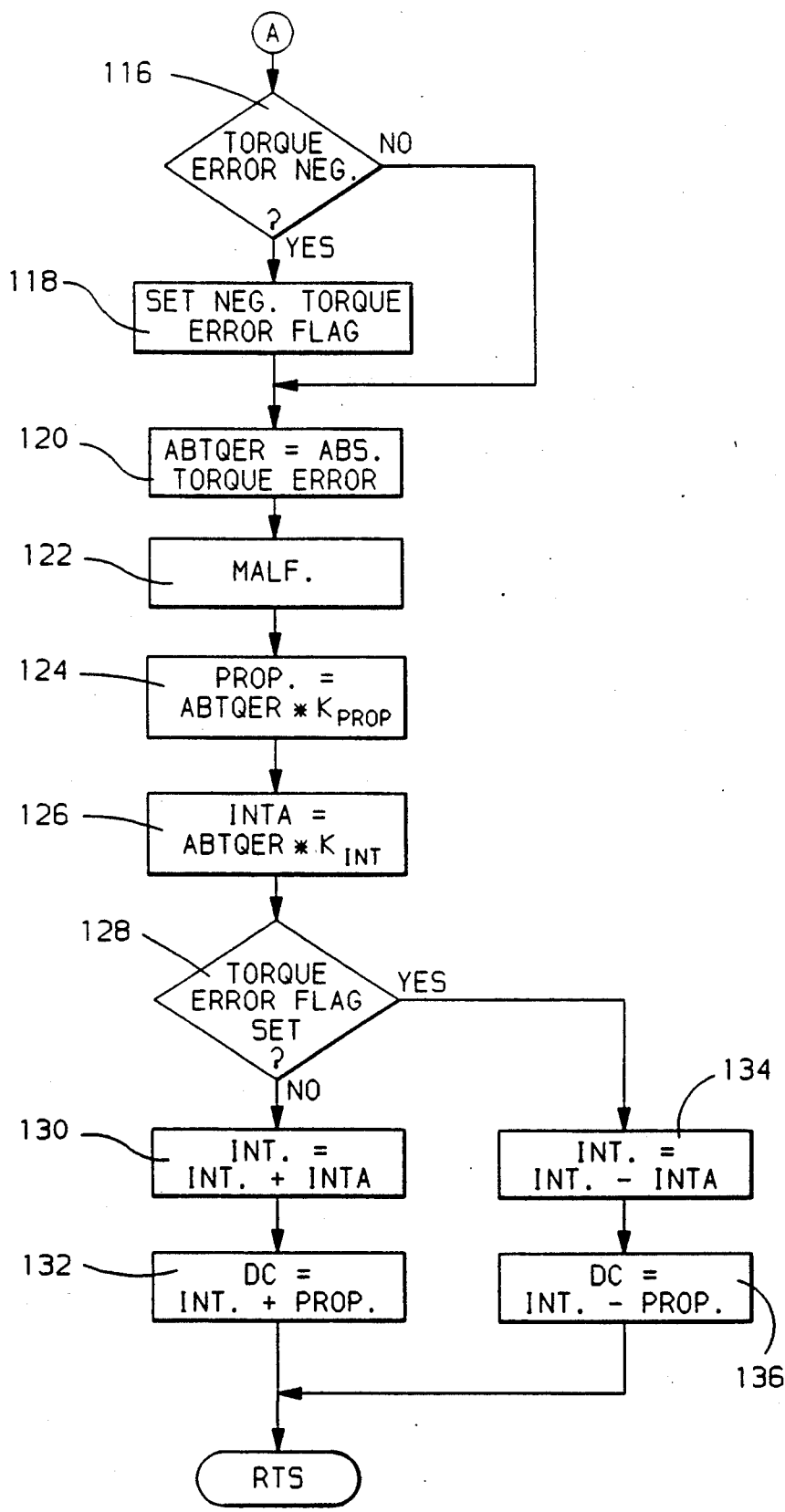

Referring to FIGS. 3a and 3b, the supercharger boost control routine repeatedly executed by the control unit at the appropriate interrupt interval is illustrated. The routine is entered at step 76 and proceeds to time the period the engine 10 fuel system is operating in a power enrichment mode. First, operation of the engine 10 in a power enrichment mode is determined at step 78. Operation in a power enrichment mode may be determined from a flag set by the fuel control algorithm or alternatively determined by observing the power enrichment enabling conditions. By way of example, power enrichment may be enabled when the throttle position signal TP indicates a position of the throttle 32 greater than a calibration reference. If operation in power enrichment is determined, a power enrichment timer is incremented at step 80 and otherwise decremented toward a limit of zero at step 82.

Step 84 determines whether conditions exist at which it is desired to disable boost or limit boost by applying full boost pressure to the pressure chamber 66 of the valve actuator 62. This has the effect of opening the bypass valve 60 whenever the amount of pressure boost exceeds the reference established by the spring 70. Conditions whereat it may be desired to disable or limit boost pressure may include operation of the transmission 14 in reverse gear or sensed engine/vehicle operating fault conditions. If any of these conditions exist, the duty cycle of the solenoid 74 control signal is set at step 86 to 0% to apply the output boost pressure (manifold pressure) to the control valve 62.

The next series of steps 88 through 100 determined which gear the transmission is operating in. In this embodiment, it is assumed that the transmission 14 has four forward gear ratios. At the step 88, a gear pointer is initialized at the number 3. This number will be increased or decreased if the transmission has more or less forward gear ratios. Step 90 determines if the transmission is in fourth gear. This information as well as the operation of the transmission in the other gears is based on the gear ratio being commanded by the control unit 36 in operation of its transmission control routine. If not operating in fourth gear, the gear pointer is decremented at step 92. Otherwise, the remainder of this series of steps are bypassed. Following step 92, step 94 determines if the transmission is in third gear. If not, the gear pointer is decremented at step 96. Otherwise, the remainder of this series of steps are bypassed. Following step 96, step 98 determines if the transmission is in second gear. If not, the gear pointer is decremented at step 100. Otherwise, step 100 is bypassed. The pointer value resulting from this series of steps represents the transmission operating gear.

The next step 102 determines the maximum allowable torque input value MWTQ to the transmission 14 which comprises the torque converter 12 output torque. In this embodiment, there is a torque limit value MXTQ associated with each of the transmission gears. These values are predetermined values based on transmission design and may not be exceeded in order to insure high transmission reliability. The predetermined values are stored in permanent memory in the control unit 36 as a function of transmission gear. The appropriate torque converter 12 torque output limit value MXTQ is retrieved from that memory at step 102 based on the transmission gear represented by the value of the gear pointer previously set.

It is desirable to further limit the drivetrain torque output during hot engine operation to assist in engine cooling. In this embodiment, a hot engine condition is indicated if the fuel control algorithm is controlling fuel based on a hot open loop routine. Operation in a hot open loop mode may be determined from a flag set by the fuel control algorithm or alternatively determined by observing the hot open loop enabling conditions. By way of example, hot engine operation may be represented by a value of coolant temperature TEMP greater than a calibration value in combination with a vehicle speed value SPD greater than a calibration value for a predetermined time period. Step 104 determines if a hot engine operating condition exists. If so, the maximum allowable torque converter 12 torque output value determined at step 102 based on transmission gear is reduced at step 106 by a factor $K_{HOL}$ which is a multiplier having a value less than unity.

Extended power enrichment with high powertrain torque output may result in excessive piston heating conditions. To prevent this potential for overheating, the maximum torque limit MXTQ is reduced when the engine 10 is operated in power enrichment for an extended period of time. This condition is sensed at step 108 which compares the power enrichment timer controlled at steps 80 and 82 reaches a predetermined count $T_{PE}$. If the extended power enrichment condition is sensed, the maximum allowable torque converter 12 torque output value MXTQ is reduced at step 110 by a factor $K_{PE}$ which is a multiplier having a value less than unity.

At step 112, a negative torque error flag is cleared after which the value of torque error is determined at step 114 by subtracting the actual torque output of the torque converter 12 from the maximum torque limit value MXTQ. It should be noted here that the sign of the error is negative when there is a condition of excessive torque output of the torque converter 12.

The actual torque output of the torque converter 12 is determined by first determining the output torque of the engine 10. The manner in which this torque value is computed is well known and may take the form of the expression:

Engine Torque = [(Scaling Constant)*(A/F Efficiency Term)*(Airflow/Engine Speed)] − Friction Torque where the A/F Efficiency term is a calibration term determined by testing using a torque sensor which correlates the response of the engine due to fueling under wide open throttle operation and where the Friction Torque term is predetermined function of factors including engine speed and temperature. The actual torque output of the torque converter 12 is then obtained by multiplying the engine torque by a factor that is a predetermined function of the engine speed.

If the next step 116 determines that the torque error is negative, step 118 sets a negative torque error flag. This flag will later be used to determine the direction of adjustment of the duty cycle of the control signal provided to the solenoid 74. Next at step 120, a value ABTQER is set equal to the absolute value of the torque error.

At step 122, a malfunction subroutine is executed to determine if a fault condition exists. This routine will be described in reference to FIG. 3.

The next steps 124 through 136 provide for closed loop adjustment of the torque output of the torque converter 12 to limit the torque output at the limit value MXTQ. The closed loop adjustment includes integral and proportional terms for adjusting the duty cycle of the signal to the solenoid 74 and therefore the pressure value in the chamber 66. As previously described, increasing the duty cycle of the signal functions to vary the pressure toward atmospheric pressure and decreasing the duty cycle functions to vary the pressure toward the boosted engine manifold pressure. At 100% duty cycle, the pressure is at atmospheric pressure and no torque limiting results. At 0% duty cycle, the pressure is at the boosted manifold pressure resulting in a maximum opening of the bypass valve for maximum torque limiting. By control of the duty cycle at intermediate values, variable regulation of the output torque of the torque converter to is provided.

At step 124, the proportional term of the closed loop adjustment of the duty cycle is determined. This proportional term is equal to the absolute torque error ABTQER multiplied by a gain factor $K_{PROP}$. At step 126, the amount of change INTA in the integral term of the closed loop adjustment of the duty cycle is determined. This change is equal to the absolute torque error ABTQER multiplied by a gain factor $K_{INT}$.

Step 128 determines if the actual output torque of the torque converter 12 is greater than or less than the limit torque value MXTQ by sampling the state of the torque error flag. If the flag is cleared, indicating the actual torque is less than the limit value, step 130 determines the integral term INT of the closed loop adjustment by adding the change INTA of the integral term determined at step 126 to the last determined value of the integral term INT to effect an increase in the duty cycle of the control signal supplied to the solenoid 74. At step 132, the duty cycle of the control signal supplied to the solenoid 74 is determined by adding the proportional term determined at step 124 to the integral term INT determined at step 130. As long as the output torque is less than the limit torque, through repeated executions of the foregoing steps, the duty cycle of the control signal is progressively increased until either the output torque becomes excessive or until a 100% duty cycle is reached which enables maximum boost pressure.

If step 128 senses that the torque error flag is set indicating the actual torque output of the torque converter 12 exceeds the maximum allowable torque limit value MXTQ thereby requiring a reduction in the boost pressure in order to establish the actual torque output at the limit value, step 134 determines the integral term INT of the closed loop adjustment by subtracting the change INTA determined at step 126 from the last determined value of the integral term INT to effect a decrease in the duty cycle of the control signal supplied to the solenoid 74. At step 136, the duty cycle of the control signal supplied to the solenoid 74 is determined by subtracting the proportional term determined at step 124 from the integral term INT determined at step 134. As long as the output torque is greater than the limit torque, through repeated executions of the foregoing steps including steps 134 and 136, the duty cycle of the control signal is progressively decreased until the output torque becomes equal to the limit torque value MXTQ.

As long as the maximum possible boost pressure resulting from the bypass valve 60 being closed results in a torque output of the torque converter 12 that is greater than the limit torque value MXTQ, repeated executions of the steps 128-136 will adjust the position of the bypass valve to an intermediate position at which the resulting actual torque output is equal to the limit torque value.

Figure 4:
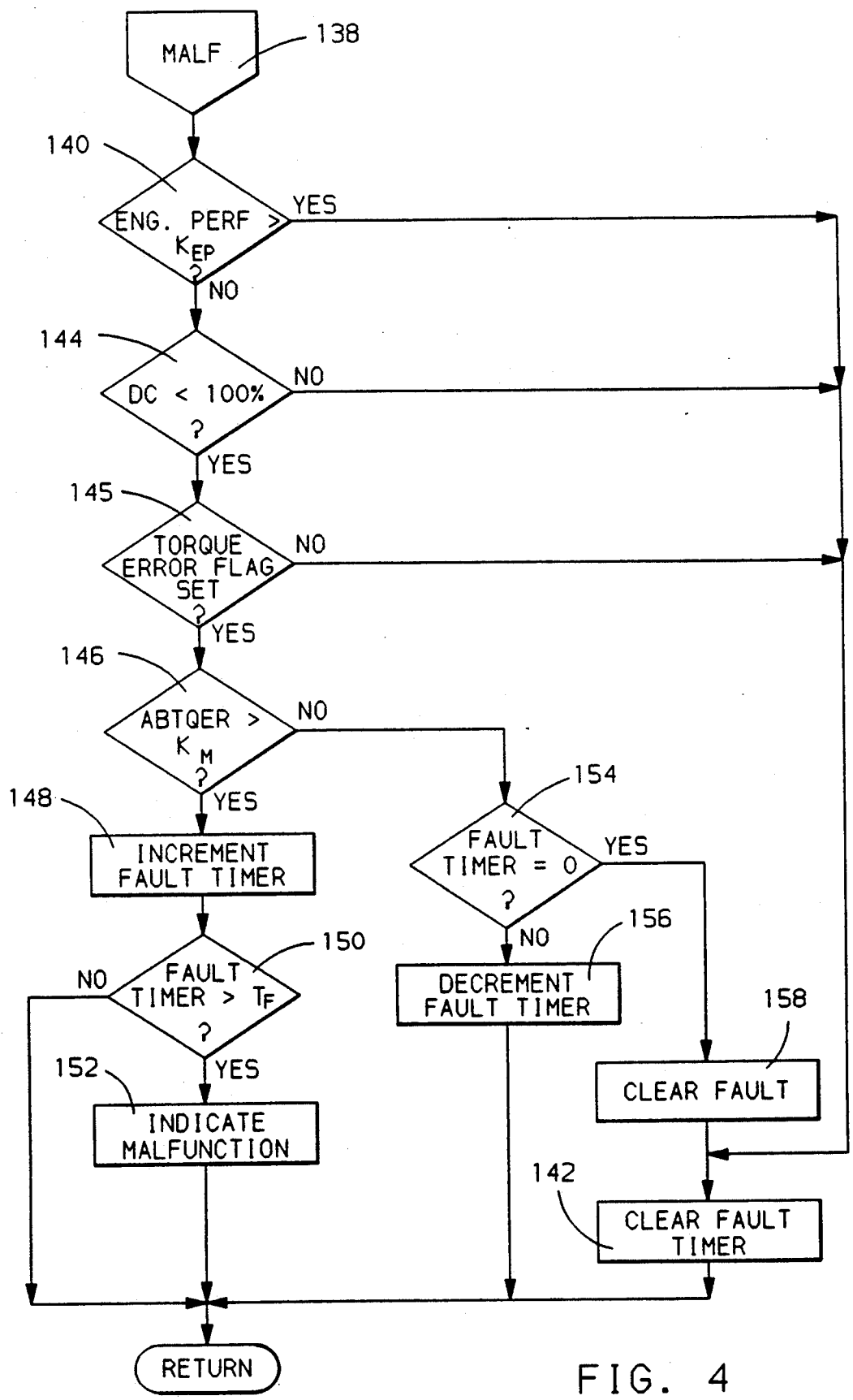

Referring now to FIG. 4, the malfunction routine 122 of FIG. 3 is illustrated. This routine is entered at step 138 and proceeds to a step 140 where an engine performance value, which is the computed torque output of the torque converter 12, is compared with a calibration constant $K_{EP}$. When the engine performance value exceeds this value, an engine condition exists whereat the regulation of FIG. 3, may not be capable of reducing the torque output to the limit value even at 0% duty cycle of the control signal. For example, this could occur at cold ambient air conditions. When this condition is sensed, a fault timer is cleared at step 142. If the condition does not exist, the program checks at step 144 if the duty cycle of the control signal is less than 100% indicating an attempt to limit torque in response to a sensed condition of excessive torque output of the torque converter 12. If at 100%, the fault timer is reset at step 142. If less than 100% duty cycle, step 145 determines if the torque is excessive (represented by the torque error flag controlled by steps 112, 116 and 118 of FIG. 3) and if not, the fault timer is cleared at step 142.

If the system is limiting torque (step 144=Y), the actual torque output is still excessive (step 145=Y), step 146 checks to see if the excess torque ABTQER (determined at step 120 of FIG.3) is greater than a threshold value $K_M$. If greater, the fault timer is incremented at step 148 after which step 150 determines if the fault timer value exceeds a calibration time $T_F$ within which the torque routine would normally reduce the torque error to within the threshold value If the fault time exceeds $T_F$, a fault condition exists and step 152 provides for an indication of the fault condition. This indication may be the storing of the fault condition in memory and/or the signaling to the vehicle operator of the fault condition. If the fault time has not exceeded the threshold $T_F$, step 152 is bypassed.

Returning to step 146, if the excess torque does not exceed the threshold $K_M$, the fault timer sampled and compared to zero. If not zero, the timer is decremented at step 156. When the fault timer is at zero, the fault indication is cleared at step 158 after which the fault timer is cleared at step 142.

While a specific preferred embodiment has been described, it is understood many modifications may be made by the exercise of skill in the art without departing from the scope of the invention.

The embodiments of the invention in which an exclusive property or privilege is claimed are defined as follows:

1. A method of limiting the boost pressure output of a supercharger of an internal combustion engine of a vehicle having a drive train including the engine, the method comprising the steps of:
   computing an output torque value at a predetermined point in the driveline;
   determining a torque error that is the amount the computed output torque exceeds a maximum torque limit; and
   decreasing the boost pressure output of the supercharger in response to the determined torque error to establish the computed output torque at the maximum torque limit to thereby limit the computed output torque at the maximum torque limit.

2. The method of claim 1 further including the steps of:
   sensing a hot engine run condition and
   decreasing the maximum torque limit by a predetermined factor when a hot engine run condition is sensed.

3. The method of claim 1 further including the steps of:
   sensing a power enrichment condition of the engine;
   timing the duration of the power enrichment condition; and
   decreasing the maximum torque limit by a predetermined factor when the timed duration of the power enrichment condition exceeds a predetermined value.

4. A method of limiting the boost pressure output of a supercharger of an internal combustion engine of a vehicle having a drive train including the engine and a torque converter that drives an automatic transmission having a predetermined number of selectively operable gear rations, the method comprising the steps of:
   storing a predetermined maximum allowable torque value for each one of the gear rations of the transmission;
   computing the torque output of the torque converter;
   comparing the computed torque output of the torque converter with the stored maximum allowable torque value corresponding to the selected gear;
   decreasing the boost pressure torque of the supercharger in response to the determined output error to establish the computed output torque at the maximum output limit to thereby limit the computed torque at the maximum torque limit.

5. A method of limiting the boost pressure output of a supercharger of an internal combustion engine of a vehicle having a drive train including the engine and a torque converter that drives an automatic transmission having a predetermined number of selectively operable gear ratios, the method comprising the steps of:
   storing a predetermined maximum allowable torque input value for each one of the gear ratios of the transmission;
   computing the torque output of the torque converter;
   determining a maximum allowable torque output of the torque converter by (A) selecting the stored maximum allowable torque input value associated with the selected gear ratio and (B) reducing the selected torque input value by a predetermined factor in response to a predetermined engine operating condition;
   determining a torque error that is the amount the computed torque output of the torque converter exceeds the determined maximum allowable torque output of the torque converter; and
   decreasing the boost pressure output of the supercharger in response to the determined torque error by an amount to reduce the determined torque error to zero so as to limit the computed torque output of the torque converter at the determined maximum allowable torque output.

6. The method of claim 5 further including the step of sensing a hot running condition of the engine and wherein the hot running condition of the engine comprises the predetermined engine operating condition.

7. The method of claim 5 further including the steps of:
   sensing a power enrichment condition of the engine and
   timing the duration of the power enrichment condition, the predetermined engine operating condition comprising a condition wherein the timed duration of the power enrichment condition exceeds a predetermined value.

* * * * *